United States Patent [19]

Kaman et al.

[11] 4,400,585
[45] Aug. 23, 1983

[54] METHOD AND APPARATUS FOR AUTOMATICALLY ATTEMPTING TO SEIZE A RADIO CHANNEL IN A MULTICHANNEL COMMUNICATION SYSTEM

[75] Inventors: Richard A. Kaman, Lake Zurich; Kenneth A. Felix, Crystal Lake; Philip J. Smanski, Palatine; John R. Haug, Mount Prospect, all of Ill.

[73] Assignee: Motorola, Inc., Schaumburg, Ill.

[21] Appl. No.: 227,901

[22] Filed: Jan. 23, 1981

Related U.S. Application Data

[63] Continuation of Ser. No. 99,106, Nov. 30, 1979, abandoned.

[51] Int. Cl.$^3$ ................................................ H04M 11/00
[52] U.S. Cl. ......................................... 179/2 EB; 455/34; 455/54
[58] Field of Search ............... 179/2 E, 2 EB; 455/31, 455/34, 53, 54, 49

[56] References Cited

U.S. PATENT DOCUMENTS

| | | | |
|---|---|---|---|
| 3,351,714 | 11/1967 | Kunzelman et al. | 179/2 EB |
| 3,885,108 | 5/1975 | Zock | 179/90 B |
| 3,936,616 | 2/1976 | DiGianfilippo et al. | 179/2 EB |
| 4,103,106 | 7/1978 | Sechan | 179/2 EB |
| 4,122,304 | 10/1978 | Mallien | 179/2 EB |
| 4,143,243 | 3/1979 | Sutton | 179/90 B |

OTHER PUBLICATIONS

Motorola Instruction Manual, Automatic Channel Sentry Board Models TRN 8879A, TRN8880A, 8/15/79, Motorola Service Publications Dept.

Primary Examiner—G. Z. Rubinson
Assistant Examiner—W. J. Brady
Attorney, Agent, or Firm—Rolland R. Hackbart; James W. Gillman

[57] ABSTRACT

Apparatus is disclosed for enabling a mobile radiotelephone to automatically attempt to seize a radio channel in a multichannel radio communication system. The mobile radiotelephone scans the radio channels for a non-busy radio channel and provides an indication signal when detecting a non-busy radio channel. A counter which is continuously clocked by a clock signal is incremented for each clock cycle interval of the clock signal in response to the presence of the indication signal and is decremented for each clock cycle interval of the clock signal in response to the absence of the indication signal. Thus, the totalized count of the counter is proportional to the degree of radio channel blocking of the radiotelephone system. After an unsuccessful channel seizure attempt by the mobile radiotelephone user, time interval generating circuitry provides a random time interval that has a maximum magnitude that is inversely proportional to the totallized count of the counter. Thus, the maximum random time interval is shortest when the totallized count of the counter is greatest. At the end of the random time interval, circuitry automatically attempts to seize a radio channel and if unsuccessful, additional automatic channel seizure attempts are provided after corresponding random time intervals. Thus, overall radiotelephone system efficiency is enhanced by dynamically optimizing the average random time interval between automatic channel seizure attempts according to the degree of radio channel blocking.

42 Claims, 8 Drawing Figures

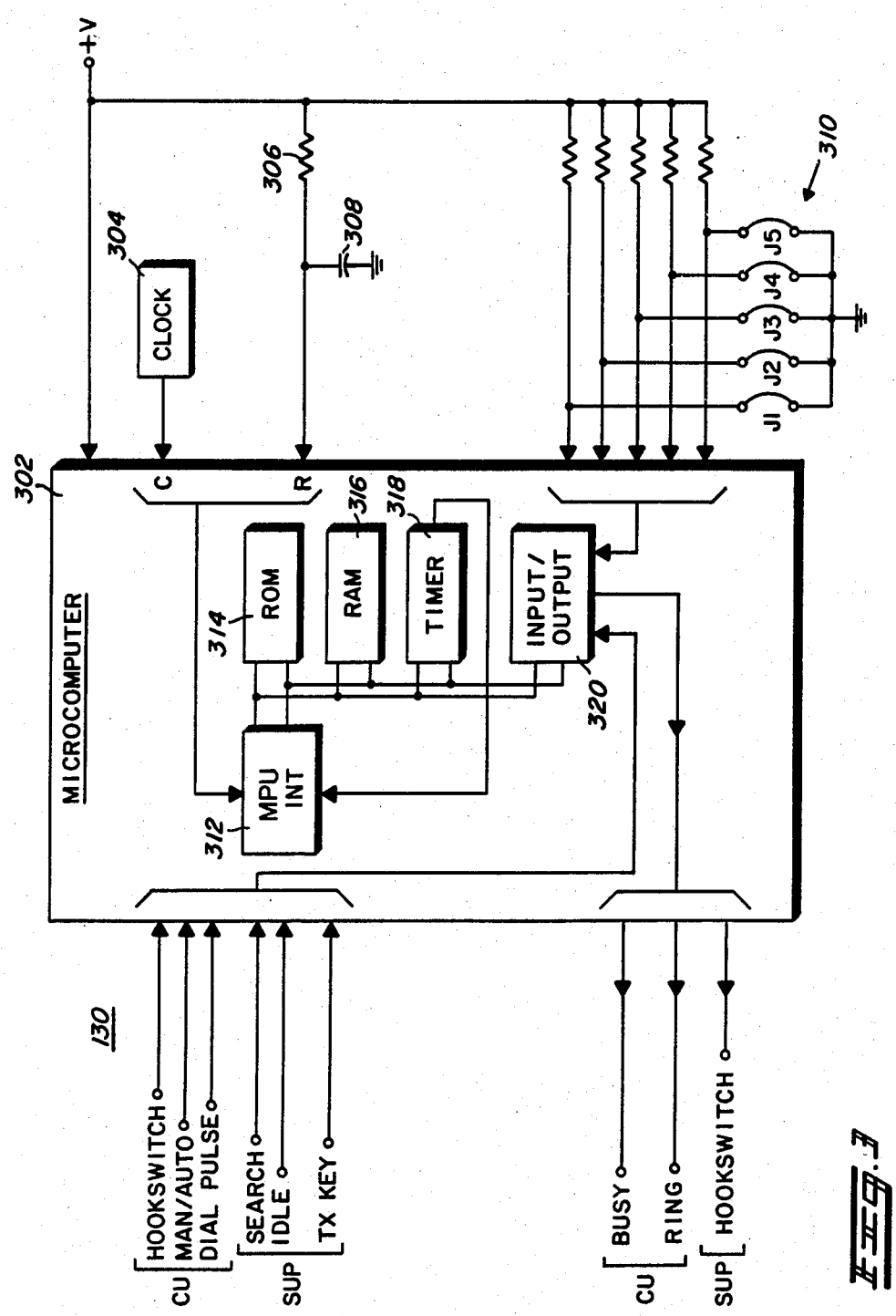

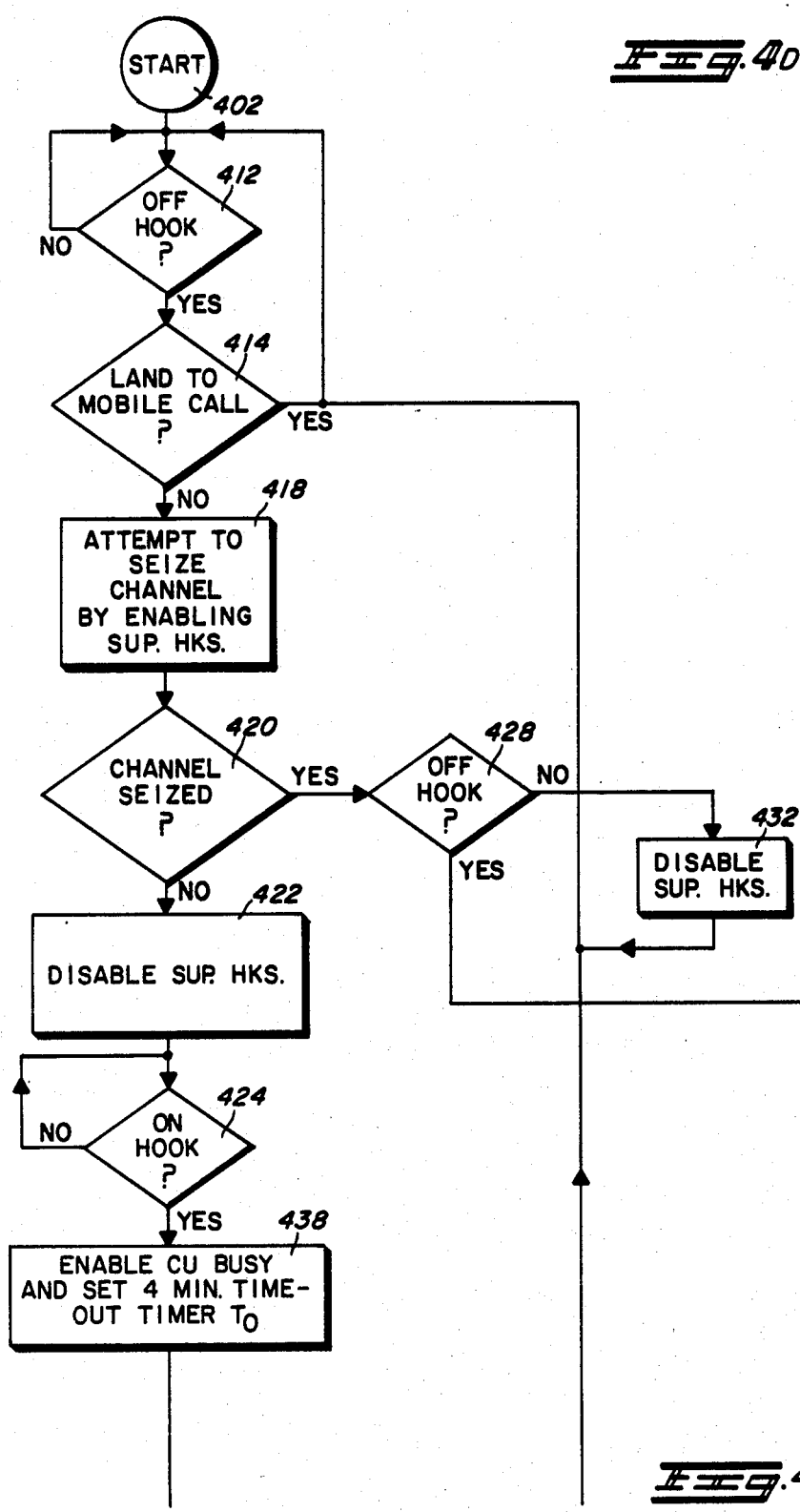

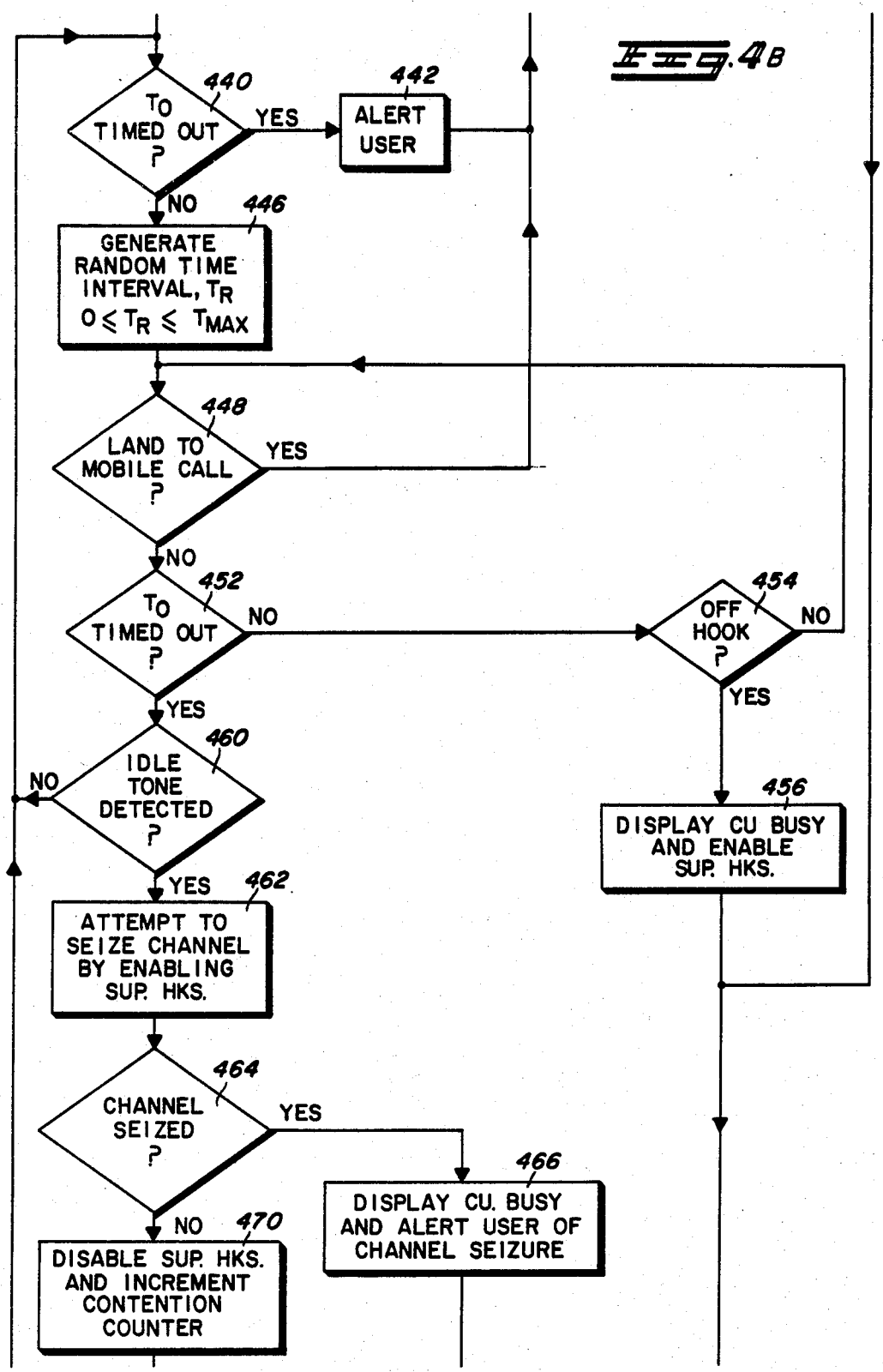

METHOD AND APPARATUS FOR AUTOMATICALLY ATTEMPTING TO SEIZE A RADIO CHANNEL IN A MULTICHANNEL COMMUNICATION SYSTEM

This is a continuation of application Ser. No. 099,106, filed Nov. 30, 1979 now abandoned.

BACKGROUND OF THE INVENTION

The present invention relates to multichannel communication systems, and, more particularly, to a method and apparatus for attempting to seize a radio channel in a multichannel communication system. The method and apparatus of the present invention are particularly well adapted to be utilized in mobile radiotelephone systems for enabling a mobile radiotelephone station to automatically attempt to seize a radio channel for placing a telephone call-hereon.

In conventional mobile radiotelephone systems, mobile radiotelephone stations are constantly contending with one another for non-busy radio channels because of the limited number of radio channels available for such systems. These prior art radiotelephone systems are typically architectured such that all mobile stations lock on to a particular radio channel that is identified as available by the presence of a particular tone, commonly referred to as idle tone. Thus, all mobile stations continuously scan all of the radio channels for the presence of idle tone and lock to the radio channel carrying idle tone. During heavy usage periods call of the radio channels of such a radiotelephone system tend to be continuously busy, thus blocking new calls initiated by the mobile stations. As a result, all of the mobile stations are essentially constantly scanning for a radio channel carrying idle tone. If a mobile station user lifts the handset to make a telephone call under these conditions, the telephone call will not be completed and the user will be notified that the system is busy. Then, in order to reinitiate a telephone call, the user must physically place the handset back on hook and remove the handset again. Since all of the radio channels in the system tend to remain constantly busy during heavy usage periods, the user must repeatedly remove and replace the handset in order to attempt to seize a radio channel. If a radio channel becomes available, it is highly probable that several users will attempt to simultaneously seize the same non-busy radio channel. Under such conditions, at most one, but possibly none of the contending users will be successful because the respective channel seizure attempts interfere with one another. Thus, during heavy usage periods when the probability of radio channel blocking is high, not only is the user subjected to considerable inconvenience, but also system performance can be significantly degraded by the contention of multiple users for a non-busy radio channel.

The inconvenience to the user may be alleviated to some degree by providing the mobile station with the capability of automatically attempting to seize a radio channel at periodic intervals. However, if the time interval between such automatic attempts to seize a channel is substantially the same for all mobile stations, the probability of contention between multiple users is still very great. According to another approach, once a non-busy radio channel has been found, a random time delay may be provided before attempting to seize the non-busy radio channel. However, the utilization of a random time delay does not take into account whether or not the radiotelephone system is being lightly or heavily used. Thus, neither of the foregoing prior art approaches has adequately solved the problem of contention between multiple users, while also being responsive to the degree of radio channel blocking experienced in radiotelephone systems.

SUMMARY OF THE INVENTION

Accordingly, it is an object of the present invention to provide an improved method and apparatus for automatically attempting to seize a radio channel in a multichannel communication system that significantly reduces contention for non-busy radio channels between multiple users.

It is another object of the present invention to provide an improved method and apparatus for automatically attempting to seize a radio channel in a multichannel communication system that is continuously responsive to the degree of radio channel blocking.

It is yet a further object of the present invention to provide an improved method and apparatus for automatically attempting to seize a radio channel in a multichannel communication system that initiates automatic attempts to seize a radio channel in response to a previously unsuccessful attempt.

It is yet another object of the present invention to provide an improved method and apparatus for enabling mobile stations to automatically attempt to seize a radio channel in a multichannel radio communication system, where the automatic attempts to seize a radio channel are provided at random time intervals from a previously unsuccessful attempt, while still providing the capability of receiving a call at the mobile station during the random time intervals.

Briefly described, the invention encompasses control circuitry for enabling a mobile station of a multichannel radio communication system to automatically attempt to seize a radio channel in response to an unsuccessful channel seizure attempt. The mobile radio station includes circuitry for scanning the radio channels for a non-busy radio channel and providing an indication signal when a non-busy radio channel has been detected. The mobile station also includes circuitry for attempting to seize a radio channel. For example, an attempt to seize a radio channel may be initiated in response to removal of a handset by a mobile station user or by activation of an off-hook switch by the mobile station user. The attempt to seize a radio channel may be unsuccessful either because a non-busy radio channel is not available or because two or more mobile stations are contending for the same non-busy radio channel.

The control circuitry further includes clock generating circuitry, counting circuitry, random time interval generating circuitry and circuitry for automatically attempting to seize a radio channel. The counting circuitry continuously provides a totallized count of the clock cycle intervals of a clock signal provided by the clock generating circuitry, where the counting circuitry is incremented for each clock cycle interval in response to the presence of the indication signal and decremented for each clock cycle interval in response to the absence of the indication signal. The random time interval generating circuitry is responsive to an unsuccessful channel seizure attempt for generating a random time interval having a magnitude that is at most a maximum magnitude, where the maximum magnitude is inversely proportional to the totallized count provided by the counting circuitry. At the end of the random time interval, the automatic seizure circuitry automatically attempts to seize a radio channel. Since the counting circuitry provides a totallized count that is inversely proportional to the degree of radio channel blocking, the average random time interval provided by the random time interval generating circuitry will be shorter in periods of low system usage and longer in periods of high system usage.

The present invention further encompasses a method of automatically attempting to seize a non-busy radio channel in a multichannel radio communication system in response to a previously unsuccessful channel seizure attempt. The steps of the inventive method include: continuously scanning the radio channels and detecting a non-busy radio channel; establishing a time interval having a predetermined magnitude; increasing the magnitude of the time interval when a non-busy radio channel is detected; decreasing the magnitude of the time interval when a non-busy radio channel is not detected; attempting to seize a radio channel; generating in response to an unsuccessful attempt to seize a radio channel a random time interval having a maximum magnitude that is inversely proportional to the magnitude of the time interval; and automatically attempting to seize a radio channel at the end of the random time interval. The method may further provide another random time interval if the automatic channel seizure attempt is unsuccessful.

Thus, the inventive method contemplates ascertaining the degree of usage of the radio channels and adjusting the magnitude of the maximum time interval accordingly. As a result, the maximum time interval of the random delay will be smallest when radio channel usage is low and will be largest when radio channel usage is high.

Thus, the control circuitry and method of the present invention not only diminish contention by randomizing the time interval between channel seizure attempts, but also are responsive to the degree of radio channel blocking for dynamically decreasing the average time interval between channel seizure attempts during periods of low system usage and dynamically increasing the average time interval between channel seizure attempts during periods of high system usage.

BRIEF DESCRIPTION OF THE DRAWINGS

FIG. 3 is a block diagram of another embodiment of the MACS unit included in FIG. 1.

DETAILED DESCRIPTION OF THE PREFERRED EMBODIMENTS

Figure 1:
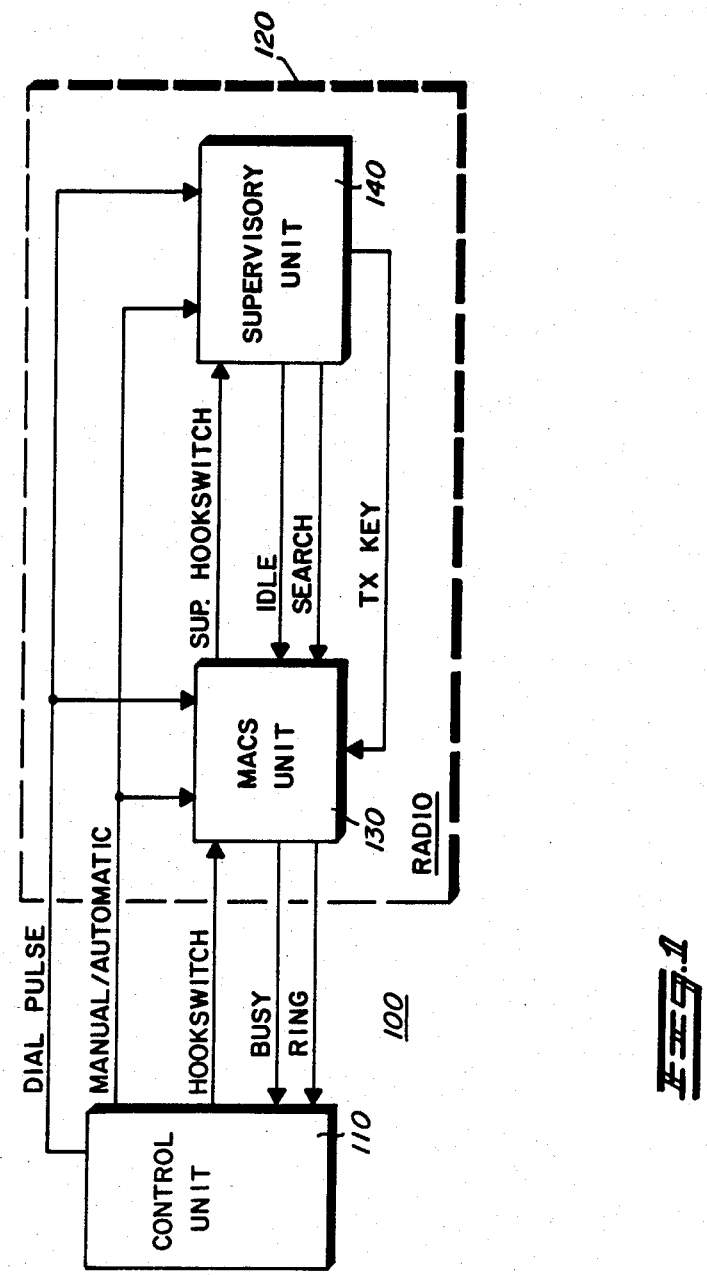
FIG. 1 is a block diagram of a mobile radiotelephone station embodying the present invention.

In FIG. 1, there is illustrated a block diagram of a mobile radiotelephone 100 embodying the present invention. The mobile radiotelephone 100 includes a control unit 110 and a radio 120. The radio 120 further includes a Motorola Automatic Channel Sentry (MACS) unit 130, a supervisory unit 140 (such as that described in U.S. Pat. No. 3,458,664) and transmitting and receiving circuitry (not illustrated). The control unit 110 may be any of a number of commercially available mobile radiotelephone control units, such as those described in Motorola Instruction Manuals, Nos. 68P81033E12, 68P81040E88, and 68P1024E25, published by the Service Publications Department, Motorola, Inc., Schaumburg, Ill. The control unit 110 typically includes a telephone type handset, a cradle accepting the handset and a pushbutton or rotary type dial for allowing the user to place telephone calls. The radio 120 may be any of a number of conventional radios which include a supervisory unit 120 and transmitting and receiving circuitry, such as, for example, those described in Motorola Manuals 68P81029E65 and 68P81037E85, published by the Service Publications Department, Motorola, Inc., Schaumburg, Ill. The radio 120 typically includes radio transmitting and receiving circuitry (not illustrated) and a supervisory unit 140 for scanning and detecting non-busy radio channels and for providing the appropriate supervision and tone signalling required in a particular radiotelephone system.

The mobile radiotelephone 100 may be utilized in any of a number of manually accessed or automatically accessed radiotelephone system. The most prevalent radiotelephone system available through most telephone companies is commonly referred to as the "IMTS" system (Improved Mobile Telephone System). In the IMTS system, one of a group of radio channels is marked as the non-busy channel by the presence of a so-called idle tone. All mobile radiotelephones continuously scan for the idle tone and lock to the particular radio channel carrying the idle tone. Since all mobile radiotelephones are locked to the non-busy radio channel carrying idle tone, land to mobile telephone calls need only be placed on the non-busy radio channel in order to reach any of the mobile radiotelephones. However, although such operation simplifies the placement of land to mobile calls, it creates serious contention problems between multiple mobile users who substantially simultaneously attempt to seize the non-busy radio channel. The MACS unit 130 embodying the present invention effectively reduces the problem of contention for the non-busy radio channel while at the same time avoiding the drawbacks and pitfalls heretofore inadequately addressed by other prior art solutions.

Figure 2:
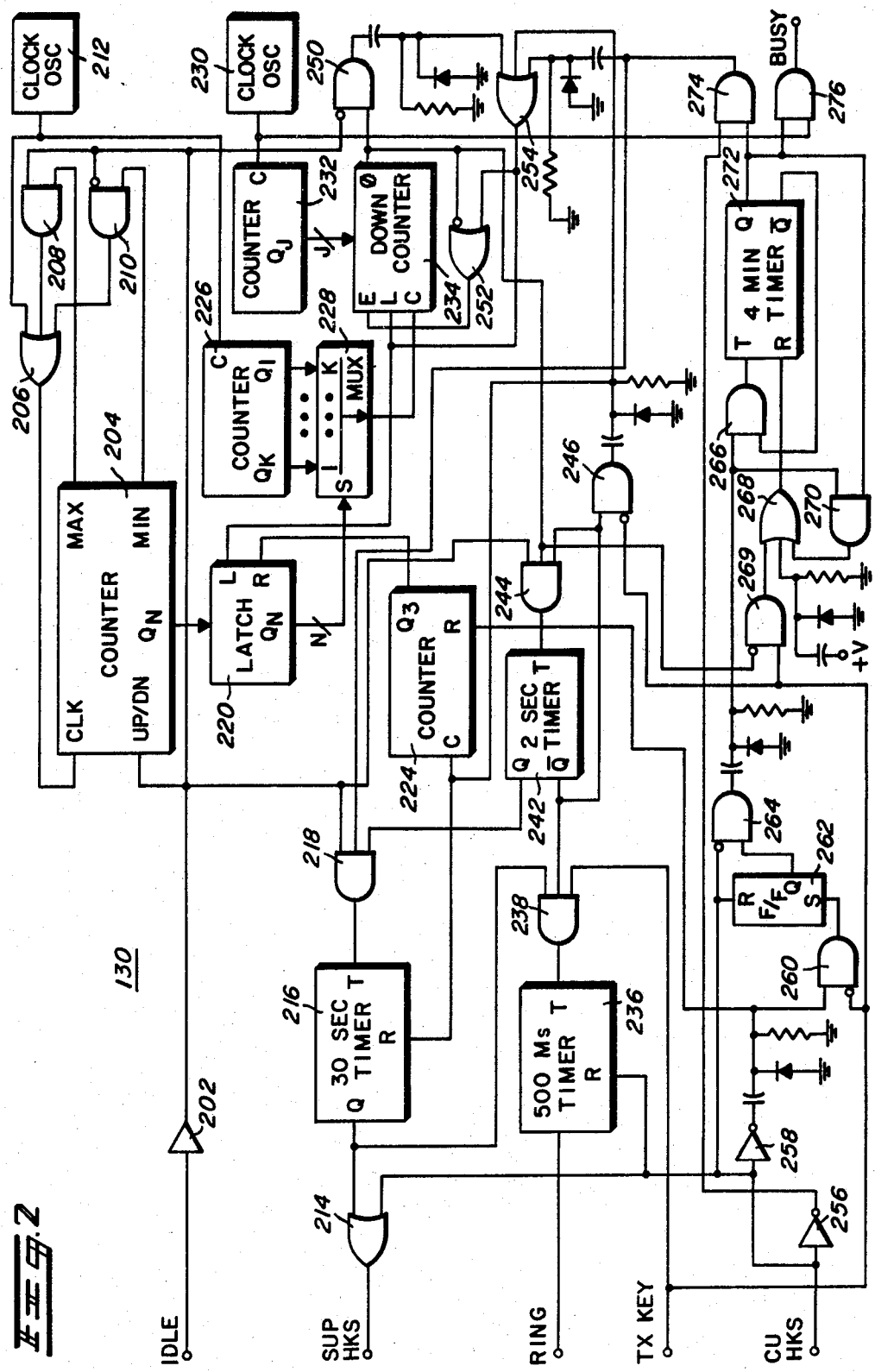
FIG. 2 is a block diagram of an embodiment of the MACS unit included in FIG. 1.

Referring to FIG. 2, there is illustrated an embodiment of the MACS unit 130 of the present invention which provides for successive automatic seizure attempts in response to an unsuccessful channel seizure attempt by the user. The MACS unit, being interposed between the control unit and the supervisory unit (See FIG. 1), controls the state of the hookswitch signal which is normally connected directly from the control unit to the supervisory unit. The hookswitch signal is used to initiate channel seizure attempts. The MACS unit will continue to make automatic channel seizure attempts for a period of approximately four minutes, after which automatic operation is terminated. The user is visually alerted of the MACS automatic mode of operation by flashing the busy light on the control unit. If an automatic channel seizure attempt is successful, the MACS unit provides an audible ringing indication to the mobile radiotelephone user, who may then remove the handset to place a telephone call.

According to an important feature of the present invention, the MACS unit continuously monitors the idle signal from the supervisory unit for ascertaining the degree of radio channel blocking and adjusts the average random time intervals between automatic channel seizure attempts to provide longer maximum random time intervals during heavy channel usage than during light channel usage. This feature of the present invention optimizes the overall efficiency of channel allocations in the radiotelephone systems.

Referring specifically to FIG. 2, a detailed circuit diagram of a MACS unit embodying the present invention is illustrated. The MACS automatic mode of operation is initiated when the user has unsuccessfully attempted to seize a radio channel. The unsuccessful channel seizure attempt can result either because a non-busy radio channel is not available or because two or more mobile stations are contending for the same non-busy radio channel. Because a non-busy radio channel need not be present when an automatic channel seizure attempt is made, the MACS unit of the present invention simulates actual user operation. The control unit hookswitch signal and the TX key signal are utilized by the MACS unit to detect when the mobile radiotelephone user has physically removed and replaced the handset for an unsuccessful channel seizure attempt. A logical high state on the control unit hookswitch signal, indicating removal of the handset, resets the Q output of the flip-flop 262. A logical low state on the Q output of flip-flop 262 disables AND gate 264. When the mobile radiotelephone user goes on hook, the transition from a logical high state to a logical low state of the control unit hookswitch signal results in a pulse output from inverting gate 258 which sets the Q output of flip-flop 262 to a logical high state via AND gate 260. However, the Q output of flip-flop 262 will not be set if the mobile user has just completed a successful incoming or outgoing call since the TX key signal will have a logical high state disabling AND gate 260. Thus, the Q output of flip-flop 262 will only have a logical high state if the mobile user has just completed an unsuccessful channel seizure attempt. Then, the logical high state of the Q output of flip-flop 262 and the logical low state of the control unit hookswitch signal result in a pulse output from AND gate 264 which triggers four minute timer 272 via AND gate 266. Timer 266 provides a four minute time interval for the MACS automatic mode of operation. The duration of this time limit is selected to insure that during periods of heavy channel usage, the MACS automatic mode of operation of many mobile radiotelephones does not unduly burden the radiotelephone system.

The four minute time 272 is reset via OR gate 268 initially at power turn-on, via AND gate 269 by a logical high state of the TX key signal and a logical low state of the zero output of counter 234 indicating that a land to mobile call has been received and via AND gate 270 by a pulse output from AND gate 264 indicating that the user has gone off and on hook a second time. The output of the four minute timer 272 together with the clock signal from oscillator 230 enables AND gate 276 to provide repetitive pulses on the busy signal, which flashes the control unit busy light to indicate to the user that the MACS automatic mode of operation has been entered.

The output of the four minute timer 272 via AND gate 274 enables AND gate 218 and pulses NOR gate 254 for loading latch 220 and down counter 234. Latch 220 is loaded with the present state of counter 204. In accordance with the present invention, the state of counter 204 is representative of the duration of time that the idle signal from the supervisory unit has been present. Thus, counter 204 is enabled to count up in response to a logical high state of the idle signal and to count down in response to a logical low state of the idle signal. If counter 204 reaches a maximum state and the idle signal has a logical high state, the clock signal to counter 204 is disabled via AND gate 208, which forces the output of NOR gate 206 to remain at a logical high state. Similarly, if the counter reaches a minimum state and the idle signal has a logical zero state, the clock signal to counter 204 is disabled by AND gate 210, which forces the output of NOR gate 206 to remain at a logical high state. Counter 204 is incremented and decremented in response to the clock signal from clock oscillator 212. The time period for reaching the minimum and maximum states of counter 204 may be determined by appropriately selecting the frequency of clock oscillator 212 and the particular minimum and maximum states of counter 204 to provide suitable time periods for the particular mobile radiotelephone system.

As a result of the foregoing operation of counter 204, latch 220 is loaded with the maximum count if the idle signal has been present for a relatively long period of time and a minimum count if the idle signal has been absent for a relatively long period of time. Thus, the state of counter 204 is indicative of the degree of radio channel blocking. The outputs from latch 220 are coupled to the select inputs of multiplexer 228 for selecting between the various outputs of counter 226. Counter 226 is a binary counter which is coupled to clock oscillator 212 for developing a number of signals of decreasing frequency, where $Q_1$ is the highest frequency signal and $Q_k$ is the lowest frequency signal. Thus, if latch 220 contains a relatively high count, multiplexer 228 is enabled to select the higher frequency signals from counter 226, and vice versa.

In accordance with the present invention, a random count is provided by counter 232 which is continuously clocked by clock oscillator 230. Clock oscillator 230 is selected to have a frequency different from, and not harmonically related to, that of clock oscillator 212. At the same time that latch 220 is loaded, down counter 234 is also loaded with the random count from counter 232. Once loaded, down counter 234 is enabled to count down in response to the clock signal selected by multiplexer 228. Thus, a random time interval is determined by the time it takes to count down the random count in counter 232 to zero at the frequency of the clock signal selected by multiplexer 228. When down counter 234 reaches zero, the zero output disables down counter 234 from further counting via OR gate 252. The zero output from down counter 234 is also coupled to AND gate 244 which triggers two second timer 242, if the idle signal is present and timer 242 is not already triggered.

Triggering of two second timer 242 inititates an automatic channel seizure attempt. The Q output of the two second timer 242 is coupled via AND gate 218 to trigger thirty second timer 216. The output of thirty second timer 216 enables the supervisory hookswitch signal via OR gate 214 for causing the supervisory unit to initiate the channel seizure attempt. The supervisory hookswitch signal may also be enabled via OR gate 214 by the control unit hookswitch signal.

If a non-busy radio channel is available, the supervisory unit will activate the radio transmitter by enabling the TX key signal. If, at the end of the two second interval provided by timer 242, the TX key signal is still enabled, AND gate 238 will trigger 500 millisecond timer 236 for enabling the ring signal for 500 milliseconds to provide the mobile radiotelephone user with an audible indication that a radio channel has been seized. Timer 236 will be reset if the mobile user removes the handset before the end of the 500 millisecond ring burst.

If the channel seizure attempt is unsuccessful, a pulse will be provided at the output of AND gate 246 when the two second timer 242 times out. The pulse from AND gate 246 resets the thirty second timer 216, increments counter 224 and via OR gate 254 initiates another random time interval by loading latch 220 and down counter 234. Counter 224 accumulates a totallized count of the number of unsuccessful channel seizure attempts. If there have been four unseccessful channel seizure attempts, output $Q_3$ of counter 224 will have a logical high state causing latch 220 to be reset. Since latch 220 is reset, multiplexer 228 is enabled to select the lowest frequency output of counter of 226. Thus, according to the present invention, after four unsuccessful channel seizure attempts, down counter 234 will be clocked with the lowest frequency output of counter 226 for providing longer random time intervals between succeeding channel seizure attempts. This operation insures that during heavy channel usage periods the random time intervals provided by down counter 234 are increased to further minimize contention.

If the idle signal is not present when down counter 234 reaches the zero state, an automatic channel seizure attempt will not be initiated. Instead, a pulse will be provided at the output of AND gate 250 for loading latch 220 and down counter 234 via OR gate 254 to start another random time interval. If the MACS automatic mode of operation has continued for four minutes, timer 272 will time out and disable AND gate 218 to prevent further automatic channel seizure attempts. This four minute time limit insures that the radiotelephone system does not become overly burdened by contending mobile radiotelephones during heavy channel usage periods. Thus, the MACS automatic mode of operation in each mobile radiotelephone is limited to four minutes, after which the user must physically remove and replace the radiotelephone handset in order to re-enable the MACS automatic mode of operation for another four minutes.

The circuitry of FIG. 2 may be realized with conventional integrated circuit devices, such as, for example, the CMOS integrated circuit devices described in the data book entitled "Motorola CMOS Integrated Circuits", published by the Technical Information Center, Motorola Semiconductor Products Inc., Austin, Tex., 1978.

Referring to FIG. 3, a circuit diagram of another MACS unit embodying the present invention is illustrated. The MACS unit of FIG. 3 includes a microcomputer 302, a clock oscillator 304, a power on initialization circuit 306 and 308 and program select jumpers 310 which may be utilized to select between different program options. The microcomputer 302 may be any of a number of conventional microcomputers including an interruptable microprocessor (MPU) 312, read only memory (ROM) 314, a random access memory (RAM) 316, a programmable timer 318 and peripheral input/output circuitry (PIO) 320. Commercially available microcomputers such as the Intel 8048, the Motorola MC6801 and the Motorola MC6805, may be utilized for microcomputer 302. The detailed description of the operation and electrical interconnections for these conventional microcomputers are readily available from the manufacturers and the technical literature. The details of the exact interconnections for the MACS unit of FIG. 3 are provided in Motorola Instruction Manual, 68P81109E98, published by the Service Publications Department, Motorola, Inc., Schaumburg, Ill.

The microcomputer 302 is responsive to the input signals from the control unit and supervisory unit (the hookswitch, manual/automatic, dial pulse, search, idle and TX key signals), for providing the control unit and supervisory unit output signals (the busy, ring and hookswitch signals) such that microcomputer 302 provides the operation identical to that described for the MACS unit of FIG. 2. In order to provide for the MACS operation, the microcomputer 302 includes a program stored in the ROM 314 that is comprised of the operations described in the flow charts of FIGS. 4 and 5. The program is designed to include a foreground routine comprising the flow chart of FIG. 4 and an interrupt routine (background routine) comprising the flow chart of FIG. 5. In this type of program architecture, the microcomputer 302 is normally executing the foreground routine of FIG. 4 and, in response to an interrupt signal provided by timer 318, transfers to the interrupt routine of FIG. 5 to perform the operations therein. After completion of the operations in the interrupt routine of FIG. 5, the microcomputer 302 returns back to that location in the foreground routine from which it was interrupted. In the MACS unit of FIG. 3, the timer 318 is programmed to provide an interrupt signal every ten milliseconds. Thus, the microcomputer is interrupted every ten milliseconds from the foreground routine in order to perform the operations of the interrupt routine.

Figure 5:
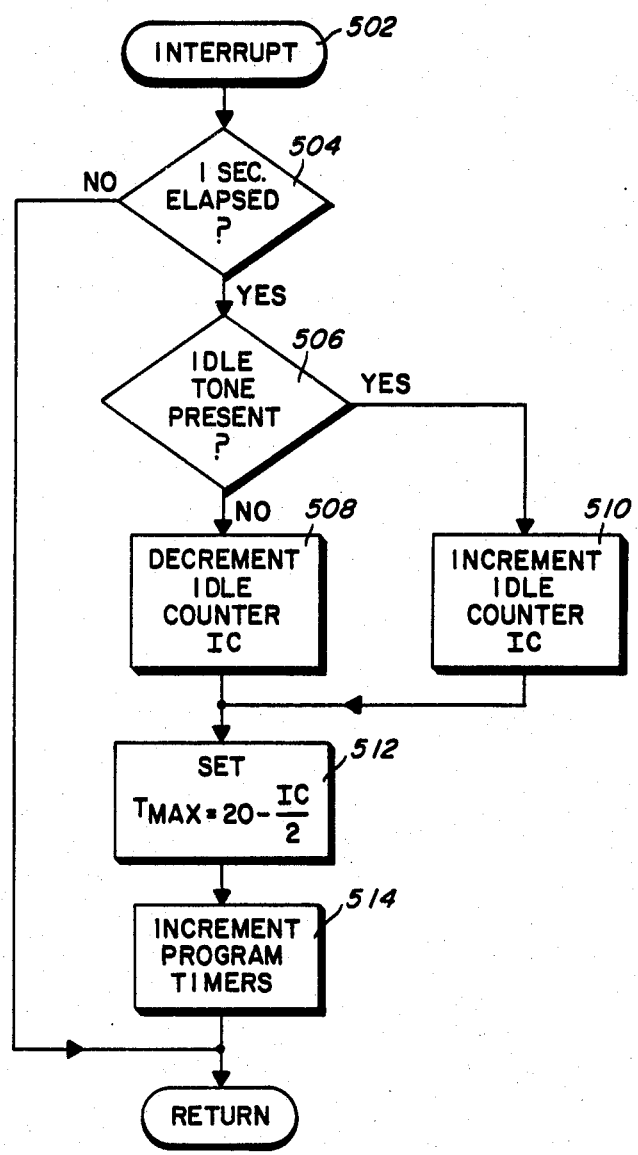

Referring to FIG. 5, a flow chart for the interrupt routine is illustrated. The interrupt routine performs various program timing functions by counting the ten millisecond time intervals between successive interrupts. Thus, a one second time interval is determined by counting one hundred of the ten millisecond interrupts. When a time interval of one second has elapsed, the various program timers are appropriately incremented or decremented. Thus, at decision block 504, if a one second time period has not elapsed, the microcomputer is returned back to the foreground routine. Otherwise, the state of idle signal is checked at decision block 506 to determine if idle tone is present. If idle tone is present, the idle tone counter (IC) is incremented at block 510. If idle tone is not present, the idle tone counter is decremented at block 508. Alternatively, decision block 506 may check to determine if idle tone is absent. Then, if idle tone is absent, the idle tone counter is incremented at block 510; and if idle tone is not absent (i.e., is present), the idle tone counter is decremented at block 508.

Next, at block 512, the maximum random time interval, $T_{MAX}$, is set according to the following equation:

$$T_{MAX} = 20 - IC/2.$$

According to the preferred embodiment of the present invention, $T_{MAX}$ may vary from five to twenty seconds. Thus, if the idle counter has a count of zero, $T_{MAX}$ is set to be twenty seconds, and if the idle counter has a maximum value of thirty, $T_{MAX}$ is set to be five seconds, although any suitable time interval may be utilized depending on the constraints of the particular radiotelephone system. In other words, $T_{MAX}$ is inversely proportional to the count of the idle counter. Alternatively, if decision block 506 checks to see if idle tone is absent, then $T_{MAX}$ is determined at block 512 by the equation: $T_{MAX}=5+IC/2$. In this case, $T_{MAX}$ is proportional to the count of the idle counter. Next, at block 514, other program timers used in the foreground routine are incremented by one second. Upon completion of the operations of the interrupt routine, the microcomputer is returned back to the location in the foreground routine from which it was interrupted.

Figure 4C:
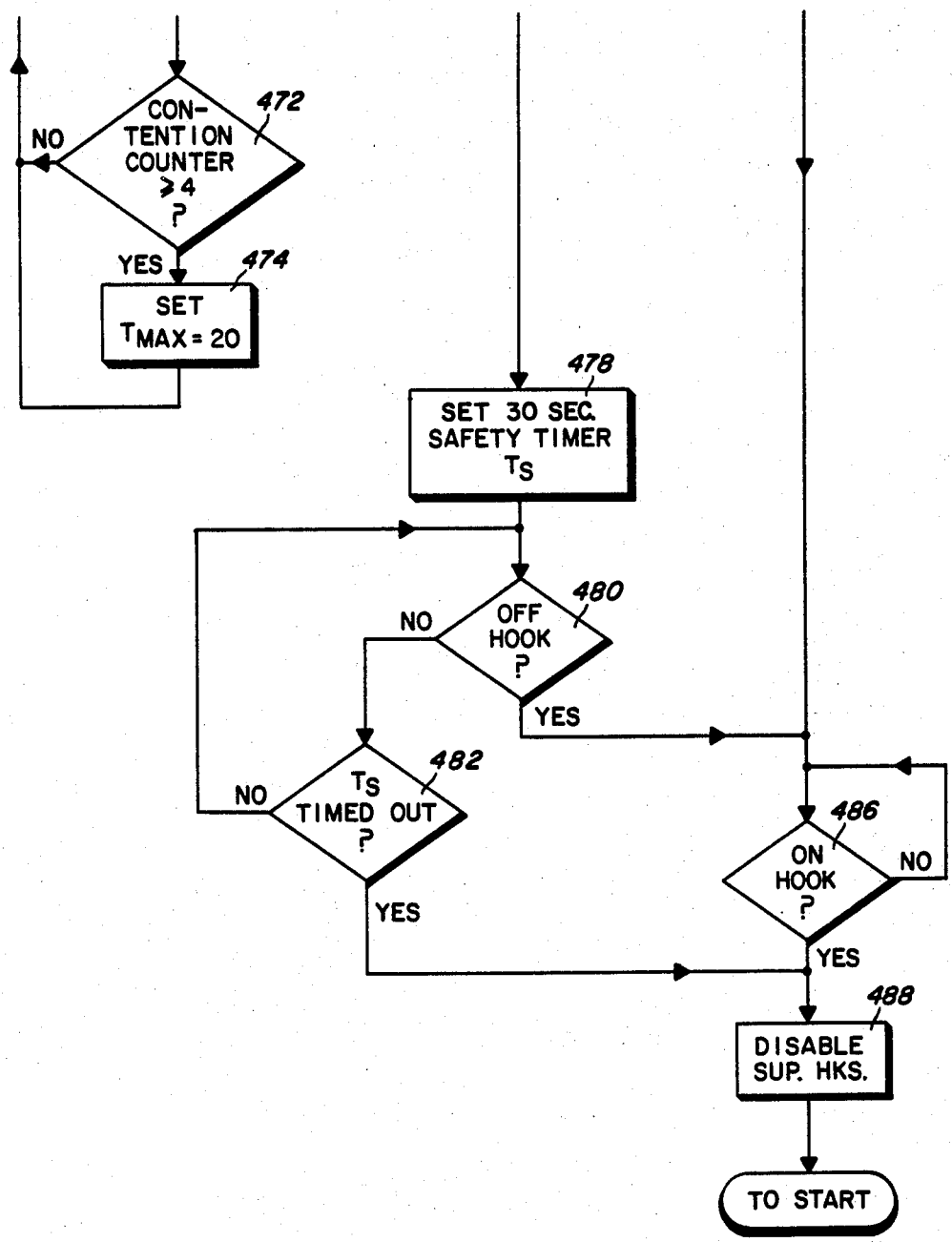
FIG. 4 including FIGS. 4A, 4B and 4C arranged as in FIG. 4D, together with FIG. 5 are detailed flow charts illustrating an embodiment of the inventive method of the present invention.

Turning to FIG. 4, a flow chart for the foreground routine is illustrated by FIGS. 4A, 4B, and 4C, which are arranged according to FIG. 4D. The microcomputer cyclically performs the functions of FIGS. 4A through 4C beginning at start block 402 of FIG. 4A.

At decision block 412 the microcomputer monitors the control unit hookswitch signal and waits for an off hook indication. Upon detecting an off hook indication, the microcomputer proceeds to decision block 414 where it is determined if a land to mobile call has been received. If a land to mobile call has been received, the microcomputer proceeds back to the start block 402. Otherwise, at block 418, an attempt to seize a radio channel is initiated by enabling the supervisory hookswitch signal. Next, at decision block 420, the microcomputer waits for a two second time interval and then determines if a radio channel has been seized by the logical state of the TX key signal. For example, a logical high state of the TX key signal may indicate that a radio channel has been seized, and vice versa.

If a radio channel has been seized, the microcomputer again checks for an off hook indication at decision block 428. If the control unit hookswitch signal provides an off hook indication, the microcomputer proceeds to block 486 in FIG. 4C. Otherwise, the microcomputer disables the supervisory hookswitch signal at block 432 and returns to the start block 402.

If a non-busy radio channel is not available or is not seized, the microcomputer proceeds from decision block 420 to block 422 where the supervisory hookswitch signal is disabled. Next, at decision block 424, the microcomputer waits for an on hook indication, and upon receiving an on hook indication, proceeds to block 438.

Next, at block 438, the MACS automatic mode of operation is indicated by enabling the busy signal so as to repetitively flash the busy light on the control unit. Also, at block 438, a time out timer, $T_0$, is triggered to provide a four minute time interval for the MACS automatic mode of operation. If a radio channel is not seized during the four minute time period, the MACS automatic mode of operation is terminated so as not to degrade the system efficiency during peak channel usage periods by unnecessarily seizing a radio channel when the user no longer desires to place a call or when the user has left the radiotelephone unattended.

Next, at decision block 440 in FIG. 4B, the time out timer, $T_0$, is checked to see if it has timed out. If the time out timer has timed out, the mobile radiotelephone user is alerted that the system is busy by enabling the ring signal to provide two bursts of ringing at block 442, after which the microcomputer returns to the start block 402 of FIG. 4A. If the time out timer has not timed out, a random time interval, $T_R$, is generated at block 446. As explained hereinabove, the maximum random time interval, $T_{MAX}$, may vary from five to twenty seconds depending on the degree of radio channel blocking. The generated random time interval, $T_R$, is a random time period having a magnitude between zero and $T_{MAX}$.

Next, at decision block 448 a check is made to see if a land to mobile call has been received. If a land to mobile call has been received, the microcomputer returns to start block 402 of FIG. 4A so that the land to mobile call may be processed. If a land to mobile call has not been received, the microcomputer proceeds to decision block 452 and checks to see if the random time interval, $T_R$, has timed out. If the random time interval, $T_R$, has not timed out, the microcomputer proceeds to decision block 454 and checks for an off hook indication. If an off hook condition is not indicated, the microcomputer proceeds back to decision block 448. Otherwise, the mobile radiotelephone user has physically removed the handset and is attempting to initiate a telephone call. Therefore, at block 456, the indication of the MACS automatic mode of operation is disabled and the supervisory hookswitch signal is enabled, after which the microcomputer proceeds to block 486 of FIG. 4C.

Once the random time interval, $T_R$, times out, the microcomputer proceeds from decision block 452 to decision block 460, where the state of the idle signal is checked to see if idle tone has been detected. The detection of idle one indicates an available non-busy radio channel. If idle tone has not been detected, the microcomputer proceeds from decision block 460 back to decision block 440 to initiate another random time interval. Otherwise, at block 462, an automatic attempt to seize the non-busy radio channel is initiated by enabling the supervisory hookswitch signal. Next, at decision block 464, the microcomputer waits two seconds and checks the logical state of the TX key signal to determine if the channel seizure attempt has been successful. If a radio channel has been seized, the microcomputer proceeds to block 466 where the indication of MACS automatic mode of operation is disabled and the mobile radiotelephone user is alerted of the channel seizure by enabling the ring signal to provide a 500 millisecond burst of ringing, after which the microcomputer proceeds to block 478 in FIG. 4C.

If a radio channel has not been seized, the microcomputer proceeds from decision block 464 to block 470 where the supervisory hookswitch signal is disabled and the contention counter is incremented by one for the unsuccessful channel seizure attempt. The contention counter totallizes the number of unsuccessful channel seizure attempts, and in reaching a totallized count of four, the maximum random time interval is set to twenty seconds hereinbelow. Next, at decision block 472 of FIG. 4C, the contention counter is checked to see if four unsuccessful channel seizure attempts have been detected. If there have been four unsuccessful channel seizure attempts, the maximum random time interval, $T_{MAX}$, is set to twenty seconds at block 474, and the microcomputer proceeds back to decision block 440 of FIG. 4B for generation of another random time interval. The microcomputer also proceeds back to decision block 440 from decision block 472 if the contention counter does not indicate four unsuccessful channel seizure attempts.

Referring to block 478 of FIG. 4C, a safety timer, $T_s$, is set to thirty seconds at block 478. The safety timer provides a thirty second time period during which the mobile radiotelephone user must physically come off hook. This operation is provided to insure that a radio channel is not indefinitely seized when a mobile radiotelephone user enables the MACS automatic mode of operation and leaves the radiotelephone unattended inadvertently. For example, the mobile radiotelephone user may initiate the MACS automatic mode of operation and then get out of his car. If an automatic channel seizure in such a case were not terminated, other mobile radiotelephone users would be prevented from using the channel inadvertently seized by such operation. Thus, the microcomputer checks for an off hook indication at decision block 480, and if an off hook condition is not indicated, proceeds to decision block 482 to check to see if the safety timer, $T_s$, has timed out. If the safety timer, $T_s$, has timed out, the microcomputer proceeds to block 488 and disables the supervisory hookswitch signal, and thereafter returns to start block 402 of FIG. 4A. Otherwise, the microcomputer proceeds from decision block 482 back to decision block 480 to wait for an off hook indication.

Block 486 of FIG. 4D is entered if an off hook condition is indicated at decision block 480 or at decision block 428 of FIG. 4A and block 454 of FIG. 4B hereinabove. Once the off hook condition is indicated, the microcomputer waits for a following on hook indication at decision block 486 to indicate that the mobile radiotelephone user has physically replaced the handset. When the mobile radiotelephone user physically hangs up, the supervisory hookswitch signal is disabled at block 488, after which the microcomputer proceeds back to start block 402 of FIG. 4A.

The flow chart of FIGS. 4 and 5 may be readily programmed into any suitable programming language, such as the well known BASIC programming language. Once programmed in a suitable language, the program for the flow charts of FIGS. 4 and 5 may then be assembled by a suitable assembly program into the appropriate machine language instructions for the particular microcomputer utilized for the MACS unit. Manufacturers of commercially available microcomputers provide assembly programs together with a multitude of other programming documentation and support services.

In summary, a new and improved method and apparatus for seizing a radio channel in a multichannel communication system has been described that continuously monitors the degree of radio channel blocking is continuously monitored for dynamically varying the average random time interval between successive automatic channel seizure attempts. The present invention is particularly well adapted for use by mobile radiotelephone in a multichannel radiotelephone communication system. Thus, in a mobile radiotelephone communication system, radio channels are automatically seized for placement of telephone calls by the mobile radiotelephone user. The present invention provides a number of important features to the mobile radiotelephone user. For example, the user may receive incoming calls during the random time intervals between automatic channel seizure attempts. Furthermore, a successful automatic seizure attempt is terminated if the user does not remove the mobile radiotelephone handset within a short period of time. Moreover, in mobile radiotelephone systems having a limited number of radio channels, the present invention greatly reduces the probability of simultaneous contention for radio channels by multiple mobile radiotelephone users while increasing overall system efficiency by dynamically optimizing the average random time interval between successive automatic channel seizure attempts according to the degree of radio channel blocking.

We claim:

1. Control means for a mobile station of a multichannel radio communication system, wherein said mobile station includes means for scanning the radio channels for a non-busy radio channel and providing an indication signal when a non-busy radio channel has been detected and means for attempting to seize a radio channel, said control means including:
    (a) means for generating a clock input having successive clock cycle intervals;
    (b) counting means responsive to the clock signal for continuously totallizing the clock cycle intervals of the clock signal to provide a totallized count thereof, the counting means being incremented for each clock cycle interval in response to the presence of the indication signal and being decremented for each clock cycle interval in response to the absence of the indication signal;
    (c) means responsive to an unsuccessful channel seizure attempt by said seizing means for generating a random time interval having a magnitude that is at most a maximum magnitude, where the maximum magnitude is inversely proportional to the totallized count of the counting means; and
    (d) means for automatically attempting to seize a radio channel at the end of the random time interval.

2. The control means according to claim 1, wherein said random time interval generating means is further responsive to unsuccessful channel seizure attempts by said automatic seizing means for generating another random time interval.

3. The control means according to claim 2, wherein said random time interval generating means is responsive to N unsuccessful channel seizure attempts by said automatic seizing means, where N is an integer number greater than one.

4. The control means according to claim 2, further including means responsive to a predetermined number of unsuccessful channel seizure attempts by said automatic seizing means for setting the maximum magnitude of the random time interval to a predetermined magnitude for the generation of succeeding random time intervals.

5. The control means according to claim 2, further including means responsive to the unsuccessful channel seizure attempt by said seizing means for generating a time interval having a predetermined magnitude, and means responsive to the end of the time interval for preventing further automatic channel seizure attempts by said automatic seizing means.

6. The control means according to claim 1, wherein said counting means further includes means for preventing further incrementing in response to a predetermined maximum totallized count and means for preventing further decrementing in response to a predetermined minimum totallized count.

7. The control means according to claim 1, wherein said radio communication system further includes land stations and establishes telephone calls between the mobile station and land stations, and said mobile station further includes means for receiving a telephone call from a land station during the random time interval.

8. The control means according to claim 7, further including means for providing a visual indication signal in response to generation of the random time interval.

9. The control means according to claim 7, further including means for providing an audible indication signal if the attempt to seize a radio channel is successful.

10. The control means according to claim 7, further including means for providing a visual indication signal if the attempt to seize a radio channel is successful.

11. The control means according to claims 9 or 10, wherein said mobile station further includes means for initiating a telephone call on a seized radio channel when enabled, and said control means further includes means for releasing the seized radio channel if the mobile station does not enable the initiating means within a predetermined time interval from the successful channel seizure attempt.

12. Control means for a mobile station of a multi-channel radio communication system, wherein said mobile station includes means for scanning the radio channels for a non-busy radio channel and providing an indication signal when a non-busy radio channel has been detected and means for attempting to seize a radio channel, said control means including:
 (a) means for generating a clock signal having successive clock cycle intervals;
 (b) counting means responsive to the clock signal for continuously totallizing the clock cycle intervals of the clock signal to provide a totallized count thereof, the counting means being decremented for each clock cycle interval in response to the presence of the indication signal and being incremented for each clock cycle interval in response to the absence of the indication signal;
 (c) means responsive to an unsuccessful channel seizure attempt by said seizing means for generating a random time interval having a magnitude that is at most a maximum magnitude, where the maximum magnitude is proportional to the totallized count of the counting means; and
 (d) means for automatically attempting to seize a radio channel at the end of the random time interval.

13. A method of seizing a radio channel in a multi-channel radio communications system, said method comprising the steps of:
 (a) continuously scanning the radio channels and detecting a non-busy channel;
 (b) establishing a time interval having a predetermined magnitude;
 (c) increasing the magnitude of the time interval when a non-busy radio channel is detected;
 (d) decreasing the magnitude of the time interval when a non-busy radio channel is not detected;
 (e) attempting to seize a radio channel;
 (f) generating in response to an unsuccessful attempt to seize a radio channel a random time interval having a maximum magnitude that is inversely proportional to the magnitude of the time interval; and
 (g) automatically attempting to seize a radio channel at the end of the random time interval.

14. The method according to claim 13, further including the step of repeating steps (f) and (g) in response to unsuccessful automatic channel seizure attempts.

15. The method according to claim 14, wherein said repeating step repeats steps (f) and (g) a predetermined number of times.

16. The method according to claim 13 or 15, further including the step of providing a visual indication if an attempt to seize a radio channel has been successful.

17. The method according to claim 13 or 15, further including the step of providing an audible indication if an attempt to seize a radio channel has been successful.

18. The method according to claim 13, wherein step (c) further includes the step of increasing the magnitude of the time interval substantially in proportion to the duration of time that a non-busy radio channel is detected, and step (d) further includes the step of decreasing the magnitude of the time interval substantially in proportion to the duration of time that a non-busy radio channel is not detected.

19. The method according to claim 18, wherein step (c) increases the magnitude of the time interval until a predetermined maximum magnitude is reached and step (d) decreases the magnitude of the time interval until a predetermined minimum magnitude is reached.

20. The method according to claim 13, for use in a multichannel radiotelephone communication system that includes mobile radiotelephone stations and land stations and establishes telephone calls between mobile radiotelephone stations and land stations, said method enabling a mobile radiotelephone station to seize a radio channel for telephone calls from the mobile radiotelephone station to a land station.

21. The method according to claims 13 or 20, wherein step (f) further includes the step of receiving a telephone call from a land station during the random time interval.

22. The method according to claim 13, further including the steps of generating a second time interval having a predetermined magnitude in response to the unsuccessful channel seizure attempt and repeating steps (f) and (g) in response to unsuccessful automatic channel seizure attempts until the end of the second time interval.

23. The method according to claims 14 or 22, further including the step of setting the magnitude of the time interval to a predetermined maximum magnitude when said repeated steps have been repeated a predetermined number of times.

24. A method of seizing a radio channel in a multi-channel radio communications' system, said method comprising the steps of:
 (a) continuously scanning the radio channels and detecting a non-busy radio channel;
 (b) establishing a time interval having a predetermined magnitude;
 (c) decreasing the magnitude of the time interval when a non-busy radio channel is detected;
 (d) increasing the magnitude of the time interval when a non-busy radio signal is not detected;
 (e) attempting to seize a radio channel;
 (f) generating in response to an unsuccessful attempt to seize a radio channel in random time interval having a maximum magnitude that is proportional to the magnitude of the time interval; and
 (g) automatically attempting to seize a radio channel at the end of the random time interval.

25. A method of seizing a radio channel in a multi-channel radio communications system, said method comprising the steps of:
 (a) continuously scanning the radio channels and detecting a non-busy radio channel;
 (b) establishing a time interval having a predetermined magnitude;
 (c) increasing the method of the time interval when a non-busy radio channel is detected;

(d) decreasing the magnitude of the time interval when a non-busy radio channel is not detected;
(e) generating a random time interval having a maximum magnitude that is inversely proportional to the magnitude of the time interval; and
(f) automatically attempting to seize a radio channel at the end of the random time interval.

26. The method according to claim 25, further including the step of repeating steps (e) and (f) in response to unsuccessful automatic channel seizure attempts.

27. The method according to claim 26, wherein said repeating step repeats steps (e) and (f) a predetermined number of times.

28. The method according to claim 25 or 27, further including the step of providing a visual indication if an attempt to seize a radio channel has been successful.

29. The method according to claim 25 or 27, further including the step of providing an audible indication if an attempt to seize a radio channel has been successful.

30. The method according to claim 25, wherein step (c) further includes the step of increasing the magnitude of the time interval substantially in proportion to the duration of time that a non-busy radio channel is detected, and step (d) further includes the step of decreasing the magnitude of the time interval substantially in proportion to the duration of time that a non-busy radio channel is not detected.

31. The method according to claim 30, wherein step (c) increases the magnitude of the time interval until a predetermined maximum magnitude is reached and step (d) decreases the magnitude of the time interval until a predetermined minimum magnitude is reached.

32. The method according to claim 25, for use in a multichannel radiotelephone communication system that includes mobile radiotelephone stations and land stations and establishes telephone calls between mobile radiotelephone stations and land stations, said method enabling a mobile radiotelephone station to seize a radio channel for telephone calls from the mobile radiotelephone station to a land station.

33. The method according to claim 32, wherein step (e) further includes the step of receiving a telephone call from a land station during the random time interval.

34. The method according to claim 25, further including the steps of generating a second time interval having a predetermined magnitude and repeating steps (e) and (f) until the end of the second time interval.

35. The method according to claims 27 or 34, further including the step of setting the magnitude of the time interval to a predetermined maximum magnitude when said repeated steps have been repeated a predetermined number of times.

36. A method of seizing a radio channel in a multichannel radio communications system, said method comprising the steps of:
(a) continuously scanning the radio channels and detecting a non-busy radio channel;
(b) establishing a time interval having a predetermined magnitude;
(c) decreasing the magnitude of the time interval when a non-busy radio channel is detected;
(d) increasing the magnitude of the time interval when a non-busy radio channel is not detected;
(e) generating a random time interval having a maximum magnitude that is proportional to the magnitude of the time interval; and
(f) automatically attempting to seize a radio channel at the end of the random time interval.

37. A method of seizing a radio channel in a multichannel radio communications system, said method comprising the steps of:
(a) continuously scanning the radio channels and detecting a busy radio channel;
(b) establishing a time interval having a predetermined magnitude;
(c) increasing the magnitude of the time interval when a busy radio channel is detected;
(d) decreasing the magnitude of the time interval when a busy radio channel is not detected;
(e) generating a random time interval having a maximum magnitude that is proportional to the magnitude of the time interval; and
(f) automatically attempting to seize a radio channel at the end of the random time interval.

38. A method of seizing a radio channel in a multichannel radio communications system, said method comprising the steps of:
(a) continuously scanning the radio channels and detecting a busy radio channel;
(b) establishing a time interval having a predetermined magnitude;
(c) decreasing the magnitude of the time interval when a busy radio channel is detected;
(d) increasing the magnitude of the time interval when a busy radio channel is not detected;
(e) generating a random time interval having a maximum magnitude that is inversely proportional to the magnitude of the time interval; and
(f) automatically attempting to seize a radio channel at the end of the random time interval.

39. Control means for a mobile station of a multichannel radio communication system, wherein said mobile station includes means for scanning the radio channels for a busy radio channel and providing an indication signal when a busy radio channel has been detected, said control means including:
(a) means for generating a clock signal having successive clock cycle intervals;
(b) counting means responsive to the clock signal for continuously totallizing the clock cycle intervals of the clock signal to provide a totallized count thereof, the counting means being incremented for each clock cycle interval in response to the presence of the indication signal and being decremented for each clock cycle interval in response to the absence of the indication signal;
(c) means for generating a random time interval having a magnitude that is at most a maximum magnitude, where the maximum magnitude is proportional to the totallized count of the counting means; and
(d) means for automatically attempting to seize a radio channel at the end of the random time interval.

40. Control means for a mobile station of a multichannel radio communication system, wherein said mobile station includes means for scanning the radio channels for a non-busy radio channel and providing an indication signal when a non-busy radio channel has been detected, said control means including:
(a) means for generating a clock signal having successive clock cycle intervals;
(b) counting means responsive to the clock signal for continuously totallizing the clock cycle intervals of the clock signal to provide a totallized count thereof, the counting means being incremented for each clock cycle interval in response to the presence of the indication signal and being decremented for each clock cycle interval in response to the absence of the indication signals;
(c) means for generating a random time interval having a magnitude that is at most a maximum magnitude, where the maximum magnitude is inversely proportional to the totallized count of the counting means; and
(d) means for automatically attempting to seize a radio channel at the end of the random time interval.

41. Control means for a mobile station of a multi-channel radio communication system, wherein said mobile station includes means for scanning the radio channels for a radio channel and providing an indication signal when a busy radio channel has been detected, said control means including:
(a) means for generating a clock signal having successive clock cycle intervals;
(b) counting means responsive to the clock signal for continuously totallizing the clock cycle intervals of the clock signal to provide a totallized count thereof, the counting means being decremented for each clock cycle interval in response to the presence of the indication signal and being incremented for each clock cycle interval in response to the absence of the indication signal;
(c) means for generating a random time interval having a magnitude that is at most a maximum magnitude, where the maximum magnitude is inversely proportional to the totallized count of the counting means; and
(d) means for automatically attempting to seize a radio channel at the end of the random time interval.

42. Control means for a mobile station of a multi-channel radio communication system, wherein said mobile station includes means for scanning the radio channels for a non-busy radio channel and providing an indication signal when a non-busy radio channel has been detected, said control means including:
(a) means for generating a clock signal having successive clock cycle intervals;
(b) counting means responsive to the clock signal for continuously totallizing the clock cycle intervals of the clock signal to provide a totallized count thereof, the counting means being decremented for each clock cycle interval in response to the presence of the indication signal and being incremented for each clock cycle interval in response to the absence of the indication signal;
(c) means for generating a random time interval having a magnitude that is at most a maximum magnitude, where the maximum magnitude is proportional to the totallized count of the counting means; and
(d) means for automatically attempting to seize a radio channel at the end of the random time interval.

* * * * *

UNITED STATES PATENT AND TRADEMARK OFFICE
CERTIFICATE OF CORRECTION

PATENT NO. : 4,400,585

DATED : August 23, 1983

INVENTOR(S) : Kaman, et al.

It is certified that error appears in the above—identified patent and that said Letters Patent is hereby corrected as shown below:

In column 12, line 8, delete "input" and insert --signal--.

In column 14, line 52, delete "signal" and insert --channel--.

In column 14, line 55, delete "in" and insert --a--.

In column 14, line 67, delete "method" and insert --magnitude--.

Signed and Sealed this

Second Day of April 1985

[SEAL]

Attest:

DONALD J. QUIGG

*Attesting Officer*     *Acting Commissioner of Patents and Trademarks*